United States Patent Office 3,343,962
Patented Sept. 26, 1967

3,343,962
PROCESS FOR PRODUCING A CULTURED WHEY PRODUCT
Herbert R. Peer, Le Mars, Iowa, assignor to Hansen Bros. Livestock Co., Buena Vista, Iowa, a corporation of Iowa
No Drawing. Filed July 1, 1964, Ser. No. 379,715
2 Claims. (Cl. 99—9)

This invention relates to a whey food product formulated to incorporate specific base cultures into grain carriers for use particularly as a livestock feed supplement.

It is one of the objects of this invention to provide a whey food product wherein sweet whey has been inoculated with suitable organisms which utilize sugar residues to build enzyme systems, growth factors, and other unidentified bio-chemical intermediates.

Another object of this invention is to provide a whey food product wherein further base nutrients have been added to a balance system for the purpose of concentrating a maximum organism density under the available energy supply.

A still further object of this invention is to provide a whey food product wherein substantial quantities of lactic acid are produced for the stabilization of the balanced systems and to further inhibit the growth of any foreign organisms.

In brief, the procedure for producing the whey food product of this invention includes first the step of inoculating batch lots of sweet whey with live cultures of lactobacillus acidophilus organisms which are then allowed to ferment at a suitable temperature. Next, base nutrients are added to the process as required in order to finish the culturing media at the desired level of constituents, determined through central lab testing procedures. When the culturing process is finished, suitable quantities of technical grade lactic acid are added to preserve the finished product. Next, the solution is mixed with a suitable grain such as wheat bran and dried to remove excess water. The dried product is subsequently ground and sized to meet specific premix requirements in animal feed formulations.

Through use this product has demonstrated surprising beneficial qualities in the areas of promoting animal growth, feed efficiency and enhancing the general physiological well being of animals.

The ingredients of one form of this food supplement may be as follows or a 10 gallon batch:

(1) Skim milk starter, milliliters (ml.) -------- 500
(2) Sweet whey, gallons (gal.) ---------------- 10
(3) Cobalt carbonate ($CoCO_3$), grams (gm.) ---- 25
(4) Di-ammonium phosphate (($NH_4$)$_2HPO_4$), grams (gm.) ------------------------------ 40
(5) 26° Bé. (feed grade-purity) ammonium hydroxide ($NH_4OH$), ml. ---------------------- 200
(6) Technical grade (80%) lactic acid, percent by weight (6 to 7 lbs.) ---------------------- 8
(7) Wheat bran, lbs. -------------------------- 60

The steps in the process of this invention are hereinafter described in detail:

(I) *Dri-vac development.*—The establishment of the original dri-vac includes:

(1) 500 ml. grade A skim milk is treated with 50 milligrams cobalt carbonate ($CoCO_3$) and sterilized as in the procedure for stock cultures of Step II infra.
(2) Inoculate the cooled (78° F.) sterile milk with 2 grams of commercial dried (dri-vac) lactobacillus acidophilus and incubate at 100° F. for 24 hours.

This material is then transferred in accordance with the procedure for carrying culture stocks until a live organism density of 200 to 250 million organisms per milliter is obtained, in a 24 hours period at a 1.3% to 1.6% acidity.

(II) *Stock cultures.*—This involves a method or routine for carrying, and maintaining, live inventories of lactobacillus acidophilus under refrigeration for inoculation of pre-starters III infra.

Once the establishment of live organisms has been made from the dri-vac development I, the method is concerned with replacing, each week, the stocks that have been utilized in the pre-starters. For example: Assuming the proper dri-vac development from procedure I is available, five 100 ml. samples of grade A skim milk are placed in 125-ml. Erlenmeyer flasks. Each 100 ml. sample is treated with 10 milligrams cobalt carbonate ($CoCO_3$) and stoppered securely with cotton gauze.

All five are then placed in an autoclave (or pressure cooker) for 20 minutes at 5 p.s.i. The five sterilized stocks are cooled to 100° F. and each is inoculated with 10 ml. (100° F.) of the dri-vac development culture, observing the usual precautions in making bacterial transfers.

The five inoculated stocks are then cultured at 100° F. for 24 hours, to develop their bacterial densities. The five finished stocks are numbered 1 to 5, and placed under refrigeration (36° to 38° F.) until they are used in the pre-starter operation.

Now there are five finished stock cultures (110 ml. each) under refrigeration.

If the weeks production schedule calls for 20 gallons of base culture, the following events would take place.

*Step I.*—Two 100 ml. samples of fresh grade A skim milk each treated with 10 milligrams cobalt carbonate ($CoCO_3$) are sterilized as before, and cooled to 100° F.

*Step II.*—Each 100 ml. sample is inoculated with 10 ml. each of two stocks from the refrigerator (after warming to 100° F., of course) so that two fresly inoculated stocks are ready for 24 hour culture @ 100° F. to replace the ones just used as inoculants.

*Step III.*—The remaining 100 ml. of each of these two stocks just used to inoculate the replacements is inoculated into the sterilized pre-starters of III.

In this way a refrigerated inventory is constantly maintained and the transfers are made in such a way as to give maximum insurance against contamination of stocks.

(III) *Pre-starter culture.*—Four hundred ml. of grade A skimmed milk is placed in a flask and treated with 50 mlg. of $CoCO_3$ and this solution is sterilized in an autoclave at 5 p.s.i. for 20 minutes. It is then cooled to approximately 100° F. and 100 ml. of the stock culture is added thereto. The entire 500 ml. is then placed in an oven at 100° F. for approximately 24 hours, and cultured to an organism density of 200 to 250 million organisms per ml. and 1.5 to 1.7% acidity, and to a pH of 4.0 to 4.1.

(IV) *Whey starter operation.*—One gallon of sweet whey is inoculated with the 500 ml. pre-starter after treating the 1 gallon sweet whey in the following manner. 1 gallon sweet whey is treated with:

0.1 gram $CoCO_3$ (cobalt carbonate),
0.2 gram ($NH_4$)$_2HPO_4$ (di-ammonium phosphate),
1.0 ml. 26° Bé. $NH_4OH$ (ammonium hydroxide), and heated to 180° F. for one-half hour. This material is cooled to 100° F. and inoculated with the 500 ml. pre-starter (100° F.), and incubated at 100° F. for 24 hours, or until a live organism density of 200 to 250 million organisms per milliliter has been attained. This material is then ready to inoculate the main 10 gallon batch.

(V) *Base culture process.*—Ten gallons of sweet whey are brought to 100° F. and at that time the following ingredients are separately stirred into the whey:

(1) 2 gm. of $CoCO_3$,
(2) 4 gm. of di-ammonium phophate $(NH_4)_2HPO_4$,
(3) 20 ml. of ammonium hydroxide $NH_4OH$ (26 Bé. or a purity grade of 28 percent by weight).

These three ingredients are nutrients and stimulate the growth of bacteria. The 1 gallon of whey starter described in the preceding Step IV is finished at 100° F. and is added to the 10 gallons of whey. This base culture is then maintained at 100° F. for a period of about 24 hours or until at such time as the solution reaches an acidity of approximately 1 percent and a pH of 4.5. At such time, the above three nutrients are added three times a day for three consecutive days, and they preferably are added each day at four hour intervals, such as 8:00 p.m., 12 noon, and 4:00 p.m., for example. On the fourth day, the temperature of the solution is eased down to 95° F. to commence a "steeping," and on the fifth day, the temperature is reduced to approximately 80° F. At the end of this cycle the following conditions should exist: 2.0 to 2.5% acidity, 1.5% reducing Sugar pH 4.1 to 4.2, organism density 500 to 750 million organisms per milliliter.

(VI) *Iron lactate process.*—Ferrous lactate $$(FeC_3H_5O_3)_2$$

is prepared and added to the finished process just prior to the condensing operation in the amount of .4% to 4% by weight as is desired.

Ferrous lactate is prepared separately in the laboratory as follows:

Equivalent molecular weights of sodium bicarbonate ($NaHCO_3$), mol. wt. 84.01, and lactic acid ($C_3H_6O_3$), mol. wt. 90.08, are reacted in 20% by weight of hot water, as in the following equation.

EQUATION I $$NaHCO_3 + C_3H_6O_3 \rightarrow Na(C_3H_5O_3) + H_2O + CO_3\uparrow$$

This reaction mixture is made 1% acid by the further addition of lactic acid.

Two molecular equivalents from the $Na(C_3H_5O_3)$, mol. wt. 112.06, of the reaction solution in Equation I is mixed with one molecular equivalent of a saturated solution of ferrous sulfate ($FeSO_4 \cdot 7H_2O$), mol. wt. 278.03, as in the following equation.

EQUATION II $$2Na(C_3H_5O_3) + FeSO_4 \cdot 7H_2O \rightarrow Fe(C_3H_5O_3)_2\downarrow + Na_2SO_4$$

The $Fe(C_3H_5O_3)_2\downarrow$ precipitate formed in the above displacement reaction is filtered, washed in cold water, and added to the finished process as stated before, just prior to the condensing operation.

Under certain conditions it is desirable to fortify the finished culture at this stage with additional cobalt lactate in any desired amount up to 5% by weight, of the finished culture. This material is also made separately in the laboratory, as follows:

Two molecular equivalents of lactic acid ($C_3H_6O_3$), mol. wt. 90.08, are reacted with one molecular equivalent of cobaltous carbonate ($CoCO_3$), mol. wt. 118.95, as in the following equation:

EQUATION III $$2(C_3H_6O_3) + CoCO_3 \rightarrow Co(C_3H_5O_3)_2 + H_2O + CO_2\uparrow$$

Also, at this juncture, prior to the condensing operation, Step VII, and following the treatment with iron and cobalt lactates, there should be a provision for developing the liquid phase product by treatment to the extent of 8% by weight of technical lactic acid to stabilize the finished liquid base culture.

The 8% lactic acid product may be used as a liquid, or dried with grain carrier as in the condensed product.

It is essentially an alternate route to by-pass the condensing operation, in case facilities are not available.

In the condensed route, high concentrations of lactic acid are built up through the condensing operation.

In the alternate liquid phase product, technical lactic acid is added to the finished base culture to the extent of 8 to 13% as desired, and then packaged as a liquid product, or mixed with grain carriers, as in the condensed route, for development as a dry product.

(VII) *Mixing process.*—On the sixth day, the solution is placed in a commercial condensor which takes out the water and condenses the solids. The solution is condensed until it yields approximately 10 pounds or one gallon of semi-solid slurry which is comprised of 45 to 50 percent of solids. The temperature in the condensor should not exceed 150° F. Prolonged temperatures in this range reduce the biochemical value of the finished product.

The resulting slurry is mixed with a quantity of grain carrier such as wheat bran, wheat mids, soybean meal, soybean grits, or ground corncobs. Approximately 10 pounds of slurry should be added to 9 pounds of the grain carrier. The mixture is then agitated to break it up and it is then spread out in a layer approximately one inch deep and dried for 24 to 48 hours until it has a moisture content of approximately 10 to 13 percent.

The mixture is then ground down to fines and then is ready to be mixed with an additional grain carrier in proportions dictated by the specific use to which it is being placed.

Some changes may be made in the preparation of my chemical without departing from the real spirit and purpose of my invention, and it is my intention to cover by my claims any reasonable modified equivalents which may be reasonably included within their scope.

I claim:

1. The process of making a cultured whey product, comprising,
    establishing and maintaining live lactobacillus acidophilus organisms in milk carrying a concentration of approximately 100 p.p.m. of cobalt carbonate,
    inoculating whole sweet whey fortified with at least 500 p.p.m. of cobalt carbonate with said live lactobacillus acidophilus organisms,
    heating the resulting solution to a temperature of between 90° to 110° F.,
    adding to said solution at intervals over a period of time diabasic ammonium phosphate and ammonium hydroxide,
    maintaining the pH of said solution between 3.9 and 4.4,
    and allowing said solution to ferment until an organism density of between 500 to 750 million organisms per milliliter is established.

2. The process of claim 1 wherein said solution is treated with lactic acid.

References Cited

UNITED STATES PATENTS

| | | | |
|---|---|---|---|
| 1,918,042 | 7/1933 | Nitardy et al. | 99—59 XR |
| 2,765,232 | 10/1956 | Rodgers et al. | 99—57 |
| 3,085,049 | 4/1963 | Rudy et al. | |
| 3,259,500 | 7/1966 | Barnhart et al. | 99—2 |

A. LOUIS MONACELL, *Primary Examiner.*

D. J. DONOVAN, L. M. SHAPIRO, *Assistant Examiners.*